Figure 11:
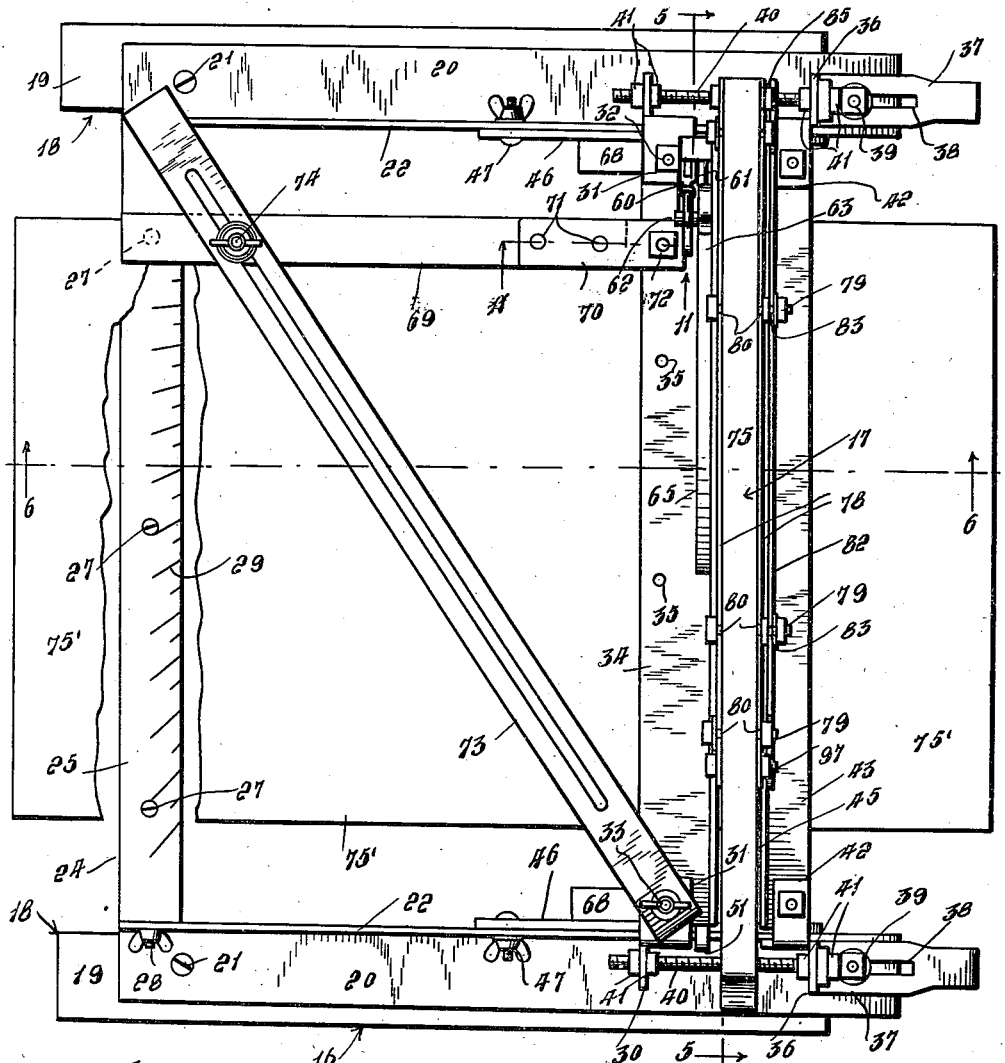

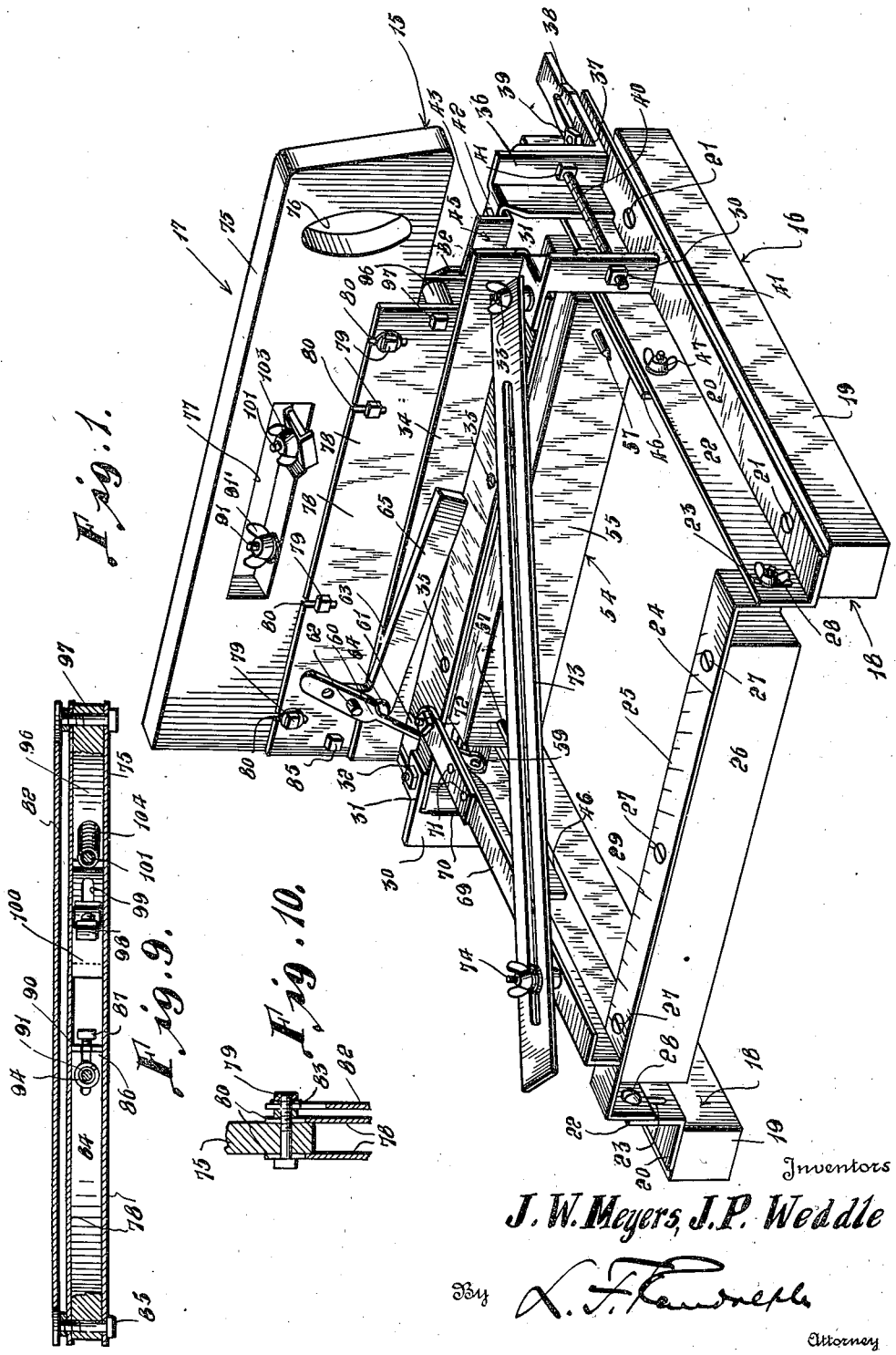

April 28, 1942.   J. P. WEDDLE ET AL   2,281,469
DADO, GAIN, AND MITER SAW
Filed Feb. 21, 1940   5 Sheets-Sheet 2

Inventors
J. W. Meyers, J. P. Weddle
By L. F. Randolph
Attorney

April 28, 1942.  J. P. WEDDLE ET AL  2,281,469
DADO, GAIN, AND MITER SAW
Filed Feb. 21, 1940  5 Sheets-Sheet 3

Inventors
J. W. Meyers, J. P. Weddle

April 28, 1942.　　J. P. WEDDLE ET AL　　2,281,469
DADO, GAIN, AND MITER SAW
Filed Feb. 21, 1940　　5 Sheets-Sheet 4

Inventors
J. W. Meyers, J. P. Weddle
By L. F. Randolph
Attorney

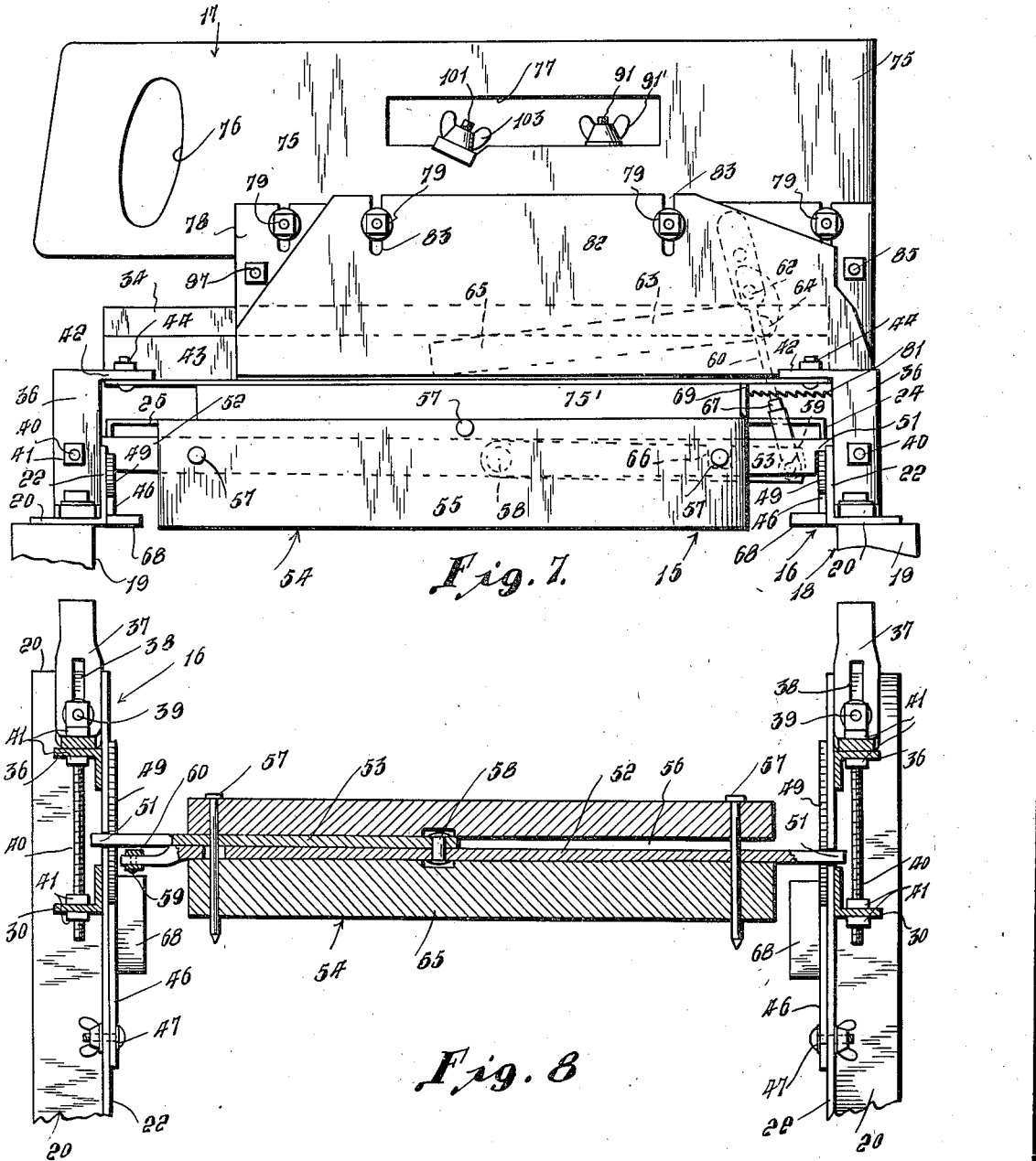

Patented Apr. 28, 1942

2,281,469

UNITED STATES PATENT OFFICE 2,281,469

DADO, GAIN, AND MITER SAW

John P. Weddle and Joe W. Meyers, Weleetka, Okla.; said Weddle assignor of ten per cent to said Meyers Application February 21, 1940, Serial No. 320,214

6 Claims. (Cl. 143—87)

This invention relates to an improved construction of saw and saw frame designed and adapted for use for cutting dadoes and gains and for forming miter joints.

More particularly, it is an aim of this invention to provide a hand tool including, generally, a saw and work holding frame which will enable carpenters to quickly and easily cut neat dadoes and gains in one operation, and which is designed and adapted to also be used for miter cutting by means of simple adjustments which may be quickly and accurately made, to thereby enable carpenters to easily make window and door jambs, formerly done by millwork, and at a substantial saving to the carpenter.

It is further aimed to provide a structure capable of use in dadoing and gaining generally and particularly designed for dadoing window and door jambs, shelf ends and uprights, and for gaining door fronts, sides and backs; and which is further designed for quickly making miter cuts by the use of conventional hand saws through adjustment of a saw guide and work guide forming a part of the device, and for removing the warp from the work at the point where the dado or gain is cut to insure the same depth throughout the width of the work.

Still another object of the invention is to provide a device in the form of a hand tool which will enable carpenters to cut dadoes or gains through knotty lumber thereby enabling use of a cheaper grade of lumber which would otherwise not be adapted for work requiring grooves, notches and mortises.

Other objects and advantages of the invention will hereinafter become more fully apparent from the following description of the drawing, which illustrate a preferred embodiment thereof, and wherein—

Figure 2:
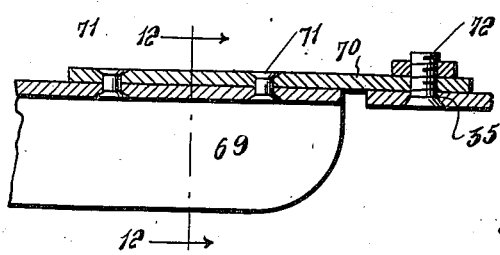
Figure 3:
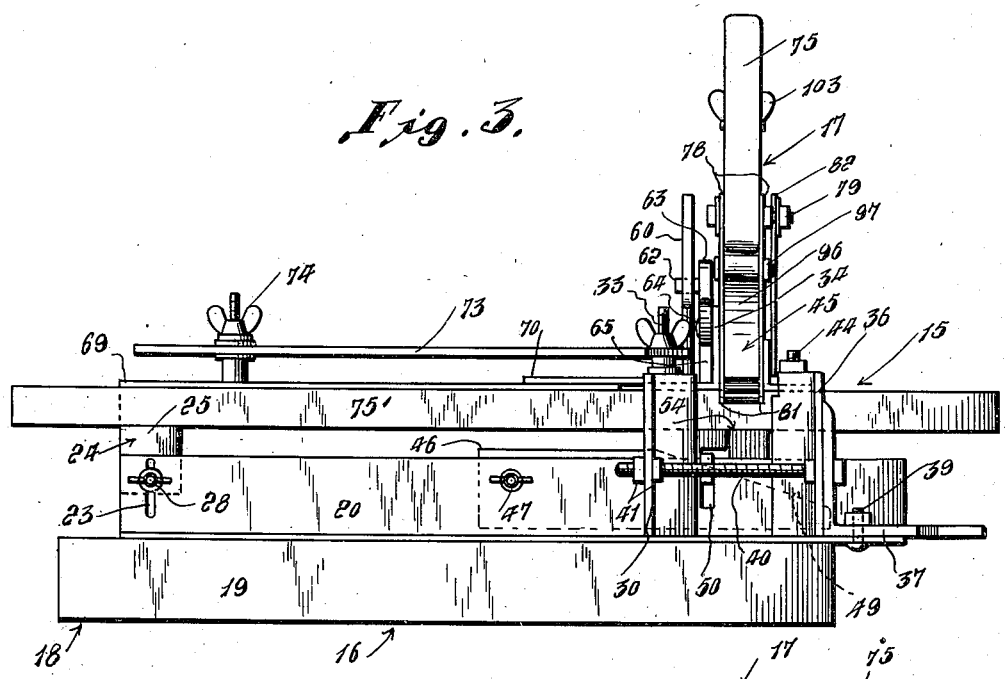
Figure 4:
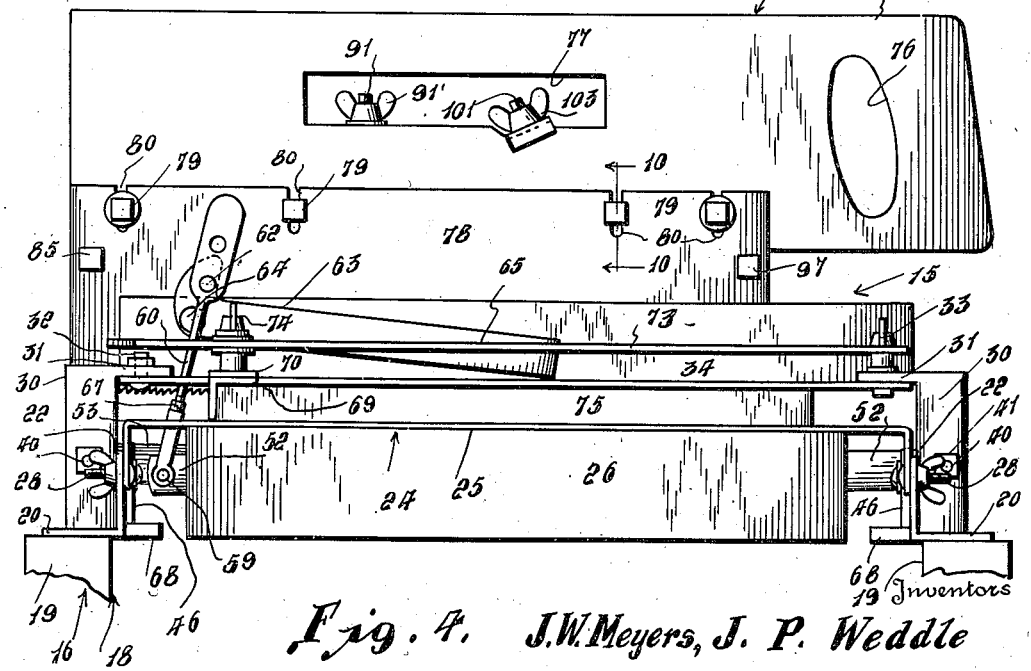
Figure 5:
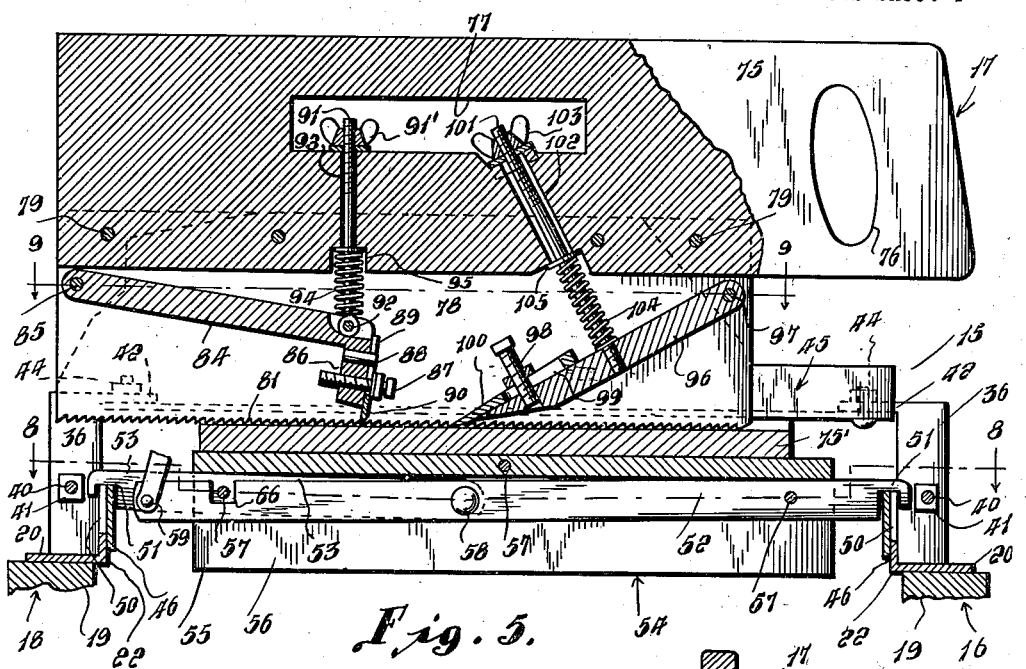
Figure 6:
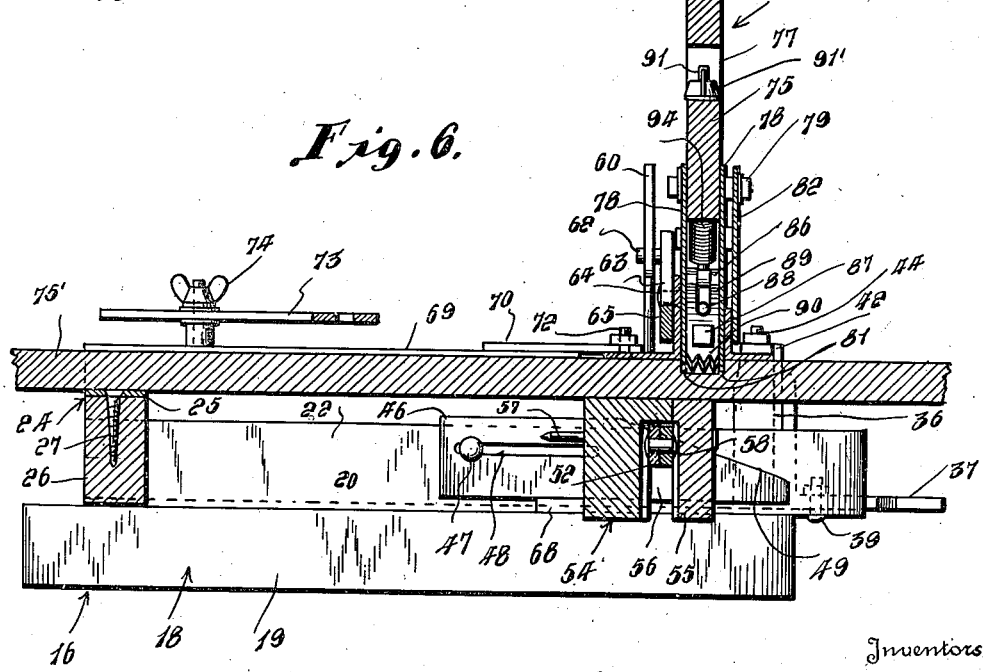

Figure 1 is an isometric view showing the material supporting frame assembled and containing the saw, Fig. 2 is a top plan view of the same, Figure 3 is a side elevational view, looking toward the right hand side of Figure 1, Figure 4 is an end view in elevation, looking from the end remote to that containing the saw, Figure 5 is a transverse vertical sectional view taken substantially along the plane of the line 5—5 of Figure 2, Figure 6 is a longitudinal vertical sectional view taken substantially along the plane of the line 6—6 of Figure 2, Figure 7 is an end view in elevation looking toward the end adjacent to which the saw is mounted, Figure 8 is a horizontal sectional view taken substantially along the plane of the line 8—8 of Figure 5, Figure 9 is a similar view taken substantially along the plane of the line 9—9 of Figure 5, Figure 10 is a transverse vertical sectional view taken substantially along the plane of the line 10—10 of Figure 4.

Figure 12:
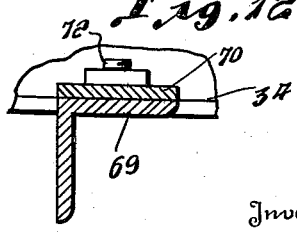

Figure 11 is a longitudinal vertical sectional view taken substantially along the plane of the line 11—11 of Figure 2, and Figure 12 is a transverse vertical sectional view taken substantially along the plane of the line 12—12 of Figure 11.

Referring more particularly to the drawings, wherein like reference characters designate like or corresponding parts throughout the different views, 15 designates generally a dadoing, gaining and mitering device in its entirety, which includes a work holding frame, designated generally 16, and the dado and gaining saw, designated generally 17.

The work holding frame 16 includes the side rails 18 each comprising a supporting sill 19 and an angle bar 20 mounted thereon and having one side secured along the upper edge thereof by the fastenings 21. The opposing upright sides 22 of the angle bars 21 project upwardly and are provided adjacent correspondings ends thereof with the substantially vertical slots 23, as best seen in Figure 1. A work support 24 includes a bar 25 having a depending elongated block 26 secured thereto by fastenings 27. The ends of the bar 25 extend beyond the ends of the block 26 and are turned downwardly to engage the adjacent sides of the upright portions 22. Screw fastenings 28 project through said downturned ends and through the slots 23 and are provided with wing nuts, as best seen in Figure 1, for clamping the work supporting member 24 between the rails 18. By loosening the wing nuts of the fastenings 28 the member 24 may be raised and lowered relatively to the rails 18, for a purpose which will hereinafter become apparent. In addition the supporting member 24 acts as a spacing member for corresponding ends of the rails 18. As best seen in Figures 1 and 2, the upper surface of the bar 25 is calibrated, as indicated at 29, with the markings thereof adapted to be designated by indicia, not shown, representing degress, for a purpose which will hereinafter become apparent.

Adjacent the opposite ends of the rails 18, standards 30 of angle iron rise from the angle bars 20 and are secured thereto, as by means of soldering, not shown. Standards 30 are provided with integral inwardly projecting flanges 31 at their tops to which are secured, by means of fastenings 32 and 33, an angle bar 34. The ends of one side of the angle bar 34 are disposed beneath the flanges 31 and secured thereto by fastenings 32 and 33, as heretofore mentioned, to dispose said side substantially horizontal, while the opposite side of the angle bar 34 is remotely disposed relatively to the bar 24, to form one side of the channel guide, as will hereinafter become apparent. The first mentioned horizontal side of the angle bar 34 is provided with a plurality of spaced openings 35 for a purpose which will hereinafter become apparent. A second pair of standards 36 are mounted on the rails 18, adjacent the opposite end of the frame 16, and like the standards 30 are disposed with one of their sides engaging the upright sides 22 and their opposite sides projecting outwardly therefrom. Standards 36 are provided with L-shaped bars 37, one side of each of which is secured to one of the outwardly extending sides of the standards 36, by any suitable means, not shown, while the opposite sides of the L-shaped members 37 are disposed on the horizontal portions of the bars 20 and extend away from the standards 30. The last mentioned sides of the angle members 37 are provided with longitudinal slots 38 to receive the nut and bolt fastenings 39 which extend through the horizontal portions of the angle bars 20 for securing the standards 36 in position on the rails 18. By loosening the nuts of the nut and bolt fastenings 39 the angle members 37 may be moved relatively to the rails 18 due to the sliding connection between the fastenings 39 and the slots 38 to adjustably position the standards 36 relatively to the standards 30, for a purpose which will hereinafter become apparent. The outwardly projecting sides of the standards 30 and 36, are connected, in pairs, by means of tie-rods 40 which extend through openings in said sides and which are adjustably secured thereto by means of nuts 41 which engage threaded ends of the tie-rods 40 on both sides of each of said outwardly projecting sides, for securely locking the pairs of standards 30 and 36 in adjusted position, relatively to each other. As best seen in Figure 7, the standards 36 are provided with inwardly projecting flanges 42, corresponding to the flanges 31, for mounting an angle bar 43 by means of nut and bolt fastenings 44 in the same manner that the angle bar 34 is mounted by the flanges 31. The upright side of the angle bar 43 is disposed adjacent to the corresponding side of the angle bar 34 and combines therewith to form a channel guide 45, for a purpose which will hereinafter become apparent. It will be obvious, that the width of the channel guide 45 may be varied by adjusting the standards 36 relatively to the standards 30.

Referring particularly to Figures 6 and 8, a pair of corresponding bars 46 are mounted on the inner sides of the upright portions of the bars 20 by means of bolt and wing nut fastenings 47 which engage openings in the upright portions of the angle bars 20 and longitudinal slots 48 in the bars 46 so that bars 46 may be adjusted longitudinally of the rails 18 and clamped in adjusted position. Bars 46, at corresponding ends, are provided with beveled upper edges forming cam surfaces 49, for a purpose which will hereinafter become apparent. The upright portions of the bars 20 are provided with notches 50 (Figure 3), disposed between the uprights 30 and 36 and contiguous with the cam surfaces 49 to receive the notched ends 51 of the bars 52 and 53, as seen in Figure 5. Bars 52 and 53 form a part of a clamp 54 which also includes a block 55 provided with a longitudinal slot 56 through which the bars 52 and 53 extend. Pins 57, extend through the blocks 55 and slot 56 to pivotally connect the bar 52 to one end of the block 55 and the bar 53 to the opposite end thereof. The intermediate portion of the bar 52 is pivotally connected to the opposite end of the bar 53 by the pivot connection 58 while the opposite, free end of the bar 52, which extends beyond one end of the block 55 is pivotally connected at 59 to a bifurcated end of a link 60 so that, as seen in Figure 6, the clamp 53 is mounted substantially beneath the channel guide 45 and is disposed transversely of the frame 16.

The shank of the link 60 extends upwardly through an opening 61 (Figure 2) formed in the horizontal portion of the bar 34, adjacent one of its ends, and the opposite flat end of the link 60 is pivotally connected by means of a pin 62 to the shorter end of a bell crank 63 which is pivotally connected at 64, at its apex, to the upright portion of the bar 34, adjacent the opening 61, as seen in Figure 4. The opposite, elongated end of the bell crank 63 forms a handle 65 for raising and lowering the link which moves across the dead center of the pivot 64 in reaching its fully raised position, as seen in Figure 1, to thereby retain it in a raised position until the operating handle 65 is swung upwardly and to the left. It will be apparent, that the link 60 together with the bars 52 and 53 support the clamp 54 and operate to move it upwardly in substantially a vertical plane when the link is raised by operation of the lever 63. Referring again to Figure 5, the bar 52 is provided with a notch 66 to receive the pin 57, which pivotally supports the bar 53 when the clamp is in a raised position. The shank portion of the link 60 is screw threaded, not shown, to engage the socket 67, as seen in Figure 7, in the bifurcated end of the link so that the ends thereof may be adjusted longitudinally relatively to each other to shorten or lengthen the link and to thereby vary the raised and lowered positions of the clamp 54. This connection is provided to accommodate the various adjustments in elevation which may be made in the clamp 54 by moving the bars 46 relatively to the side rails 18 by means of the clamping fastenings 47 so that the notched ends 51 will be caused to engage different portions of the cam surfaces 49 to thereby support the clamp 54 at different elevations and thus accommodate it to different thicknesses of material, as will hereinafter become apparent. In order to prevent the bars 46 from turning on the fastenings 47, a pair of rests 68, as best seen in Figure 4, project inwardly from the angle bars 20 to support the forward or free ends of the bars 46 when the clamp 54 is moved upwardly and into a clamping position.

A guide bar 69, formed of angle iron, is provided with an upper horizontal surface and a depending side. A plate 70, as best seen in Figures 2 and 11, is secured by means of fastenings 71 to one end of the horizontal portion of the guide bar 69 and has a free end extending therebeyond and resting on the horizontal portion of the bar 34. Said end is connected to the horizontal portion of the bar 34 by means of a nut and bolt fastening 72 which extends through one of the openings 35 and through a corresponding alined opening in the free end of the plate 70 to thereby pivotally connect the guide bar 69 to one section of the channel guide 45. It will be obvious, that the guide bar 69 may be pivotally connected at any one of the plurality of openings 35 to vary its position relatively to the channel guide 45. As seen in Figure 2, the opposite free end of the guide bar 69 is disposed with the edge of its depending side resting on the upper surface of the work support 24 and this bar 69 may be adjusted to various angles relatively to the channel guide 45, as indicated by the calibrated markings 29 on the upper surface of the bar 25. A bar 73 is pivotally mounted at one end on the fastening 33 and is provided with a longitudinal slot for slidably engaging a bolt and wing nut fastening 74 mounted in the guide bar 69, adjacent its free end, and which is adapted to be tightened to secure the guide bar 69 in adjusted position relatively to the bar 73 and in a plurality of angular positions relatively to the channel guide 45, after the guide bar 69 has been set relatively to the calibrations 29. Guide bar 69 is employed to angularly adjust a piece of material, designated 75′, as seen in Figure 2, relatively to the channel guide 45 which material is clamped by means of the clamping member 54 and partially supported by the support 24 for the purpose of cutting miter joints and angular gains and dadoes, as will hereinafter become apparent.

The saw, designated generally 17, includes a head 75 having a transverse slot 76 adjacent one end thereof to receive the fingers of an operator and to form with said end a handle portion for engaging and operating the saw. The head 75 is also provided with a longitudinal slot 77, intermediate of its ends. Referring particularly to Figures 5 and 6, a pair of corresponding saw blades 78 are mounted on opposite sides of the head 75 and adjustably connected thereto by means of a plurality of nut and bolt fastenings 79 which extend through the head 75 and through transverse slots 80 (Figure 1) in the saw blades 78 which slots open outwardly of the upper edges of said blades, and by means of which the blades 78 may be adjusted laterally relatively to the head 75. The toothed or cutting edges 81 of the blades 78 depend downwardly substantially below the bottom edge of the head 75 and are adapted to be disposed in the same horizontal plane for cutting spaced kerfs in a piece of material to substantially the same depth. Referring particularly to Figure 7, a gage plate 82 is provided with transverse slots 83, opening outwardly of its upper edge, for receiving certain of the fastenings 79 to adjustably mount it laterally of the head 75 and on the outer side of one of the blades 78. The lower edge of the gage plate 82 is adapted to be adjusted to a position above the toothed edges 81 to limit the cutting depth of the saw blades, as will hereinafter become apparent.

As seen in Figure 5, a lever 84 is pivotally mounted by means of the pin 85 which extends through the blades 78, adjacent their forward ends, and directly beneath the head 75. Lever 84 extends rearwardly between the blades 78 and is provided with a free downturned end 86 having a set screw 87 and a guide pin 88 mounted therein for engaging a slot 89 in a gouge 90 for adjustably mounting the gouge relatively to the lever end 86. A rod 91 is pivotally connected at 92 to the lever 84 adjacent its downturned end 86. The rod 91 extends upwardly through a bore 93 in the head 75 and has its free end, which is threaded, disposed in the slot 77 and provided with a wing nut 91′ so that by tightening the wing nut, lever 84 and the gouge 90 can be raised relatively to the blades 78, or lowered by loosening the wing nut. An expansion coil spring 94 is mounted on the lower portion of the rod 91 with one end thereof abutting against the lever 84 and its opposite end abutting against the inner end of a recess 95 formed in the bottom edge of the head 75. The spring 94 functions to yieldably mount the lever 84 relatively to head 75 so that the gouge may retract upon meeting an obstruction, as will hereinafter become apparent. A lever 96 is pivotally mounted adjacent the opposite ends of the blades 78 and directly beneath the head 75 by means of a bolt 97 which extends through the blades 78. Lever 96 extends forwardly and downwardly of the blades 78 and is provided with a free end which is tapered on its underside and which is provided with an upwardly extending threaded screw and lock nut 98 for engaging the slotted portion 99 of a cutting bit 100 for adjustably positioning and clamping the cutting bit relatively to the tapered free end of the lever 96. A rod 101 is threadedly secured at one end in the intermediate portion of the lever 96 and projects upwardly therefrom, at an oblique angle, through an oblique bore 102 in the head 75 and into the slot 77. A wing nut 103 is mounted on the upper threaded end of the rod 101 and is provided with a washer disposed therebeneath and engaging the upper end of the bore 102 so that the lever 96 may be raised and lowered by turning wing nut 103. Rod 101 is also provided with an expansion coil spring 104 having one end abutting against the lever 96 and its opposite end engaging an abutment plate 105 carried by the rod 101 and disposed against the lower end of the bore 102. As seen in Figure 5, the bore 102 is substantially larger in diameter than rod 101 to permit a rocking movement of the rod relatively to the bore when the lever 96 is raised and lowered. A more complete illustration and description of the saw is contained in our co-pending application, Serial No. 377,743, filed February 6, 1941, and in which the saw is claimed per se.

From the foregoing it will be obvious that a piece of lumber or other material 75′ to be dadoed or gained may be positioned, as heretofore explained, in the frame 16 and secured by the clamp 54 which will clamp it sufficiently tight to remove any warp from the lumber or material 75′. The guide channel 45 is then adjusted, as heretofore explained, until the blades 78 may be disposed therein sufficiently tight to prevent play yet sufficiently loose to prevent binding and to allow sliding movement of the blades 78 relatively to the channel guide. In this position, as seen in Figure 6, the gage plate 82 is disposed on the outer side of the upright portion of the angle bar 43 with its bottom edge disposed above the horizontal portion of the angle bar 43, a distance equal to the depth of the cut desired to be made by the saw blades 78 so that as the material 75′ is cut the gage plate 82 will move downwardly until it contacts the horizontal portion of bar 43 to prevent further downward movement of the blades 78. The toothed edges 81 will cut two spaced, substantially parallel kerfs in the material 75′ while the gouge 90 which is provided with a toothed cutting edge, as seen in Figure 6, is of substantially the same width as the space between the blades 78 for clearing the material between the kerfs and particularly for cutting through knotty portions of the lumber. The cutting bit 100, which is of substantially the same width as the gouge 90, is disposed therebehind for cleaning the dado or gain and to produce a smooth bed in the groove thus formed.

The machine 15 is also designed and well adapted for use for forming miter joints by angularly positioning the material relatively to the channel guide 45 after adjusting the guide rod 69 to the proper angle desired, as heretofore explained and the material thus arranged is then clamped by swinging the lever 63 to the position, as seen in Figure 1. A conventional hand saw may be used for cutting the miter joints in which case the channel guide 45 is adjusted to the width of the single saw blade, or if desired, one of the blades 78 may be removed and the saw 17 used for this purpose with or without the gage plate 82.

As the function and operation of the details of the invention have been described in conjunction with the description of the construction thereof, a further description of the operation of the device is deemed unnecessary.

Various modifications and changes are contemplated and may obviously be resorted to, provided they come within the scope of the claims.

We claim as our invention:

1. In a work supporting frame, a frame having clamping means at one end thereof for detachably clamping a piece of work therein, a work supporting bar adjustably mounted in said frame adjacent the opposite end thereof, a channel shaped saw guide for guiding a saw for engagement with the work, disposed substantially above said clamping means, said saw guide including a channel for receiving the saw and having means for adjusting said channel for saws of different thicknesses.

2. A device as in claim 1, comprising means pivotally connected to said frame and angularly adjustable relatively thereto for angularly positioning the work relatively to the frame for forming miter joints.

3. A device as in claim 1, said frame including spaced side rails, said clamping means including a block disposed between said rails, bars extending from the ends of said block for engaging the side rails for supporting the block therebetween, means associated with said side rails for raising and lowering the bars for adjusting the elevation of the block, a lever pivotally connected to said frame, and a link pivotally connected to said lever and to one of said bars for raising and lowering the block relatively to the frame.

4. A work holding frame comprising a guide for a cutting tool, a clamp element adjustably mounted beneath said guide to cooperate therewith for clamping a piece of material therebetween to be engaged by the cutting tool, said clamp element and tool guide combining to form a clamp for holding the material and to remove warp from the material, and means for adjusting into the width of said tool guide for accommodating it to cutting tools of various sizes.

5. A work holding frame comprising a guide for a cutting tool, a clamp element adjustably mounted beneath said guide to cooperate therewith for clamping a piece of material therebetween to be engaged by the cutting tool, said clamp element and tool guide combining to form a clamp for holding the material and to remove warp from the material, said clamp comprising a block disposed beneath the tool guide and transversely of the frame, pivotally connected link means connected to the frame and block for supporting the block in the frame, and link and lever means connected to the link means for raising and lowering the block relatively to the tool guide.

6. A work holding frame comprising a guide for a cutting tool, a clamp element adjustably mounted beneath said guide to cooperate therewith for clamping a piece of material therebetween to be engaged by the cutting tool, said clamp element and tool guide combining to form a clamp for holding the material and to remove warp from the material, said clamp comprising a block disposed beneath the tool guide and transversely of the frame, pivotally connected link means connected to the frame and block for supporting the block in the frame, and link and lever means connected to the link means for raising and lowering the block relatively to the tool guide, and means for adjustably supporting the link means on the frame for varying the raised and lowered positions of the block.

JOHN P. WEDDLE.
JOE W. MEYERS.